Patented May 21, 1946

2,400,612

UNITED STATES PATENT OFFICE 2,400,612

ADHESIVE COMPOSITION

Stanley L. Sprague, Westwood, Mass., assignor to B. B. Chemical Co., Boston, Mass., a corporation of Massachusetts No Drawing. Application November 10, 1942, Serial No. 465,162

2 Claims. (Cl. 260—42)

This invention relates to liquid adhesive compositions embodying plastic polymerized chloroprene and to methods of preparing such compositions.

Plastic polymerized chloroprene is chloroprene (also known as chloro-2-butadiene-1,3) which has been partially polymerized and is plastic in the sense that it may be worked on the rolls of a rubber mill and compounded with other ingredients in a manner similar to that in which crude rubber is treated. Such plastic polymerized chloroprene may be "cured" or "vulcanized" to a condition in which it is elastic rather than plastic and in which condition it resembles vulcanized rubber. The "curing" is probably a further polymerization of the partially polymerized chloroprene to a substantially fully polymerized condition rather than the addition of sulphur to the polymer such as is considered to occur in the vulcanization of rubber.

An object of this invention is to provide improved liquid adhesive compositions embodying plastic polymerzed chloroprene. A further object is to provide improved polymerized chloroprene adhesives from which films may be deposited which will exhibit high initial adhesive bond to similar films of polymerized chloroprene. Another object is to provide a method of preparing improved polymerized chloroprene adhesives whereby the liquid adhesive compositions, including compounding ingredients, may be kept for substantial periods of time without deterioration or premature curing.

In accordance with the above and other objects I have provided a liquid plastic polymerized chloroprene adhesive composition which when applied to a suitable surface such as leather or coated fabric and permitted to dry for a relatively short time exhibits a relatively high degree of adhesion to a similar surface so that the cement films of the thus cement-coated parts will adhere readily even with relatively light pressures, and will provide a high initial adhesive bond. This property is highly advantageous in cases where only light pressure is available, for example in the laying or cementing-down of channels in leather outsoles, and in the avoidance of so-called "dry joints" or non-adhered areas.

This result is accomplished by incorporating in the plastic polymerized chloroprene liquid adhesive composition, polyvinyl acetate in the proportion by weight of about 1% to 10% of the polymerized chloroprene. By means of such compositions and employing only light pressure, a strength of bond immediately upon placing the parts together has been obtained which was several times greater than that obtained with similar compositions containing no polyvinyl acetate. Furthermore, this increase in immediate adhesion is accomplished without any noticeable softening effect on the polymerized chloroprene cement.

According to another aspect of this invention, I have provided a method of preparing liquid adhesive compositions such as described above so that the compositions may be kept for long periods of time without deterioration or premature curing even though curing ingredients and accelerators of curing are associated with the compositions.

In carrying out the above method, the plastic polymerized chloroprene is dispersed in an organic solvent. If desired, compounding ingredients which do not promote the curing of the plastic polymerized chloroprene may be associated therewith. The compounding ingredients which promote or accelerate the curing of the polymerized chloroprene, together with other compounding ingredients, if desired, and the polyvinyl acetate, are dispersed separately in an organic solvent. The polymerized chloroprene dispersion and the polyvinyl acetate dispersion are mixed just prior to the use of the adhesive. By dispersing with the polyvinyl acetate those compounding ingredients which tend to accelerate the curing of the plastic polymerized chloroprene, premature curing of the polymerized chloroprene is prevented. Furthermore the polyvinyl acetate tends to keep comminuted compounding ingredients in suspension and to prevent precipitation and caking of the compounding ingredients in the container. Moreover, by incorporating accelerators in the polyvinyl acetate dispersion, rapid curing of the polymerized chloroprene may be caused to take place when the dispersions are mixed and the adhesive is used.

The plastic polymerized chloroprene may be present in the liquid adhesive composition of this invention to the extent of about ½ to 3 pounds to the gallon of composition. The plastic polymer itself may be prepared in the manner described in United States Letters Patent No. 1,950,436, granted March 13, 1934, upon an application of Ira Williams.

A suitable commercial form of polyvinyl acetate for use in carrying out the invention is that known as "Ayat," marketed by the Carbide and Carbon Chemicals Corporation.

The compounding ingredients employed in the adhesive composition may be those ordinarily associated with, or suitable for use with, polymerized chloroprene compositions. In certain instances, compounding ingredients may be omitted.

The liquid portion of the adhesive composition may consist of organic solvents, or of solvents together with diluents. The organic liquids should be selected so as not to throw out of colloidal solution the polymerized chloroprene or the polyvinyl acetate when the polymerized chloroprene dispersion and the polyvinyl acetate dispersion are mixed. Examples of organic liquids which are suitable for use in the adhesive composition are benzene, toluene, xylene and trichloroethylene, all of which are solvents for both plastic polymerized chloroprene and polyvinyl acetate. Ethyl acetate and butyl acetate are solvents for polyvinyl acetate, and "Sovasol #3" (naphtha) is a diluent in which neither polymerized chloroprene nor polyvinyl acetate is soluble.

A specific example of a composition in accordance with this invention is as follows:

Composition I.—Part A

| | |
|---|---|
| Plastic polymerized chloroprene__pounds__ | 18.9 |
| Phenyl-beta-naphthylamine _____do____ | 0.38 |
| Toluene _____gallons__ | 2.7 |
| Ethyl acetate_____do____ | 2.7 |
| Sovasol #3 (naphtha)_____do____ | 2.7 |
| Yield _____gallons__ | 9.6 |

Composition I.—Part B

| | |
|---|---|
| "Ayat" resin (polyvinyl acetate)___pound__ | 0.53 |
| Zinc oxide_____do____ | 0.53 |
| du Pont accelerator #808 (butyraldehyde aniline condensation product)___pound__ | 0.27 |
| Toluene _____gallons__ | 0.3 |
| Yield _____gallons__ | 0.4 |

Composition 1.—Complete

| | |
|---|---|
| Plastic polymerized chloroprene__pounds__ | 18.9 |
| "Ayat" resin (polyvinyl acetate)___do____ | 0.53 |
| Phenyl-beta-naphthylamine _____do____ | 0.38 |
| Zinc oxide_____do____ | 0.53 |
| du Pont accelerator #808 (butyraldehyde aniline condensation product)__pound__ | 0.27 |
| Toluene _____gallons__ | 3.0 |
| Ethyl acetate_____do____ | 2.7 |
| Sovasol #3 (naphtha)_____do____ | 2.7 |
| Yield _____gallons__ | 10 |

Part A was prepared by milling the plastic polymerized chloroprene and phenyl-beta-naphthylamine together on a rubber mill for a period of about ten minutes and then dispersing the milled material in the organic solvent in a suitable mixing device such as a Werner-Pfleiderer mixer.

Part B was prepared by agitating the polyvinyl acetate and the solvent in a mixer such as a Werner-Pfleiderer mixer until the resin had gone into solution and then adding the zinc oxide and accelerator separately and continuing the agitation until each compounding ingredient had been dispersed.

In the practice of the method aspect of the invention parts A and B are packaged in separate containers and mixed together just prior to use in order to form the complete Composition I.

Referring to part A of Composition I it will be noted that the polymerized chloroprene is associated only with the stabilizer phenyl-beta-naphthylamine and the solvents and diluents, whereby part A may be preserved for a long time without deterioration. Part B on the other hand contains no polymerized chloroprene; and the zinc oxide and accelerator which have a curing effect upon polymerized chloroprene have no effect on the polyvinyl acetate. The polyvinyl acetate on the other hand tends to keep the zinc oxide and accelerator in suspension and to prevent precipitation and caking thereof in the container.

In the above composition (complete formula) it will be noted that the amount of polyvinyl acetate is slightly less than 3% of the weight of the polymerized chloroprene and that the polymerized chloroprene is present in amount slightly less than 2 pounds per gallon of composition.

In Composition I, the phenyl-beta-naphthylamine functions as an antioxidant and as a stabilizer to inhibit premature curing of the polymerized chloroprene. The zinc oxide appears to assist in the curing or more complete polymerization of the plastic polymerized chloroprene. The accelerator serves to initiate the rapid curing or completion of the polymerization of the plastic polymer even at temperatures in the neighborhood of room temperature, thus making unnecessary the heating of the parts to be joined to high vulcanizing temperatures. The toluene is an organic solvent for plastic polymerized chloroprene and also for polyvinyl acetate, and the ethyl acetate and Sovasol #3 are primarily diluents.

To illustrate the quickly developed adhesive bond of adhesive compositions according to this invention I carried out certain comparative tests. Thus a liquid adhesive composition corresponding to Composition I was prepared. For comparative purposes a second composition was prepared as follows:

Composition II

| | |
|---|---|
| Plastic polymerized chloroprene__pounds__ | 18.9 |
| Phenyl-beta-naphthylamine _____do____ | 0.38 |
| Zinc oxide_____do____ | 0.53 |
| du Pont accelerator #808 (butyraldehyde aniline condensation product)__pounds__ | 0.27 |
| Toluene _____gallons__ | 3.0 |
| Ethyl acetate_____do____ | 2.7 |
| Sovasol #3 (naphtha)_____do____ | 2.7 |
| Yield _____gallons__ | 10 |

It will be noted that this composition differs from Composition I only in that the polyvinyl acetate present in Composition I has been omitted.

A third composition was prepared as follows:

Composition III

| | |
|---|---|
| Plastic polymerized chloroprene__pounds__ | 19.4 |
| Phenyl-beta-naphthylamine _____do____ | 0.38 |
| Zinc oxide_____do____ | 0.53 |
| du Pont accelerator #808 (butyraldehyde aniline condensation product)__pounds__ | 0.27 |
| Toluene _____gallons__ | 3.0 |
| Ethyl acetate_____do____ | 2.7 |
| Sovasol #3 (naphtha)_____do____ | 2.7 |
| Yield _____gallons__ | 10 |

This composition contains no polyvinyl acetate but it contains an amount of polymerized chloroprene greater than that present in either Composition I or Composition II and equal to the total of the polymerized chloroprene and vinyl acetate resin content of Composition I, namely 19.4 pounds.

To determine the tackiness or adhesive bond quickly obtainable with Compositions I, II and III, strips of neoprene-coated fabric 1½" wide were coated by brush with the compositions and permitted to dry for 15 minutes. A second coat of adhesive was then applied by brush to each strip of fabric and permitted to dry for another fifteen minute period. For each specimen, the strips of cement-coated fabric were placed in juxtaposition with the cement-coated sides together, and pressed together with a hand roller. Immediately after the cementing operation the test specimens were pulled apart on a Scott tester to determine the strength of adhesive bond. Each strength test given below is the average of four tests:

Composition I—7 lbs.
Composition II—2 lbs.
Composition III—2 lbs.

It will be noted that with the composition according to this invention, namely Composition I, a degree of immediately developed adhesive bond was produced which was over three times greater than that obtained with the adhesive of Composition II which contained no polyvinyl acetate but which otherwise was identical with Composition I. The strength of bond obtained with Composition I was also over three times greater than that obtained with Composition III which contained no polyvinyl acetate but which contained an amount of polymerized chloroprene equal to the total of the polymerized chloroprene and polyvinyl acetate in Composition I.

Having described my invention, what I claim as new and desire to secure by Letters Patent of the United States is:

1. A liquid adhesive composition comprising plastic polymerized chloroprene dissolved in an organic solvent, said composition containing polyvinyl acetate in solution in the proportion by weight of about 1% to 10% of the polymerized chloroprene, said polyvinyl acetate acting to impart initial tackiness to the mixture while the strength of the polymerized chloroprene bond is being developed without materially impairing the ultimate strength of said chloroprene adhesive bond.

2. The method of preparing a liquid adhesive composition from polymerized chloroprene and a curing agent for the polymerized chloroprene which comprises making a solution of polymerized chloroprene in a solvent liquid, making a separate solution of polyvinyl acetate in the proportion by weight of from about 1% to 10% of the polymerized chloroprene in a solvent liquid which is miscible with the first-named liquid and contains a curing agent for polymerized chloroprene, and mixing said solutions to form the liquid adhesive composition.

STANLEY L. SPRAGUE.